United States Patent
Imaizumi

(10) Patent No.: US 9,964,753 B2
(45) Date of Patent: May 8, 2018

(54) MIRROR DRIVE DEVICE CAPABLE OF HIGH-SPEED FORWARD AND BACKWARD DRIVING OF MIRROR

(71) Applicant: CANON KABUSHIKI KAISHA, Tokyo (JP)

(72) Inventor: Takuya Imaizumi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 221 days.

(21) Appl. No.: 14/743,201

(22) Filed: Jun. 18, 2015

(65) Prior Publication Data

US 2015/0378149 A1 Dec. 31, 2015

(30) Foreign Application Priority Data

Jun. 25, 2014 (JP) ................... 2014-130418

(51) Int. Cl.
*G02B 26/08* (2006.01)
*G03B 19/12* (2006.01)
*G03B 13/02* (2006.01)

(52) U.S. Cl.
CPC ......... *G02B 26/0816* (2013.01); *G03B 19/12* (2013.01); *G03B 13/02* (2013.01)

(58) Field of Classification Search
CPC .... G02B 26/10; G02B 26/08; G02B 26/0816; G02B 26/0841; G02B 6/3556; G03B 13/02; G03B 17/425; A61B 3/1015; B60R 1/06; B60R 1/072
USPC ......... 359/221.2, 221.3, 221.4, 223.1, 226.2, 359/212.2, 214.1, 871–874, 877; 396/358, 352, 356
See application file for complete search history.

(56) References Cited

U.S. PATENT DOCUMENTS

| | | | | |
|---|---|---|---|---|
| 2007/0253700 A1* | 11/2007 | Okumura | ............... | G03B 19/12 396/358 |
| 2013/0027797 A1* | 1/2013 | Yamana | ................. | G03B 19/12 359/877 |
| 2013/0136441 A1* | 5/2013 | Yamada | ................. | G03B 19/12 396/447 |

FOREIGN PATENT DOCUMENTS

| | | |
|---|---|---|
| JP | 07-168280 A | 7/1995 |
| JP | 2015-040891 A | 3/2015 |
| JP | 2015040891 A * | 3/2015 |

* cited by examiner

*Primary Examiner* — Jie Lei
(74) *Attorney, Agent, or Firm* — Fitzpatrick, Cella, Harper & Scinto

(57) ABSTRACT

A mirror drive device in which the speed of forward and backward movement of a mirror is increased while reducing a power amount required therefor without affecting a finder image and a focus distance of an image viewed through a finder. A mirror-down cam is cam-engaged with a drive shaft provided in a mirror holder, and causes the mirror holder to enter a finder observation position of a photographing optical path. A mirror-up cam is cam-engaged with the drive shaft, and causes the mirror holder to retract from the photographing optical path. A down spring urges the mirror holder toward the finder observation position with low necessary and sufficient pressure. A motor transmits rotation to the mirror-down cam and the mirror-up cam via a shift gear train. The rotation axes of the mirror-down cam and the mirror-up cam are arranged in positions different from each other.

5 Claims, 7 Drawing Sheets

MIRROR DRIVE DEVICE CAPABLE OF HIGH-SPEED FORWARD AND BACKWARD DRIVING OF MIRROR

BACKGROUND OF THE INVENTION

Field of the Invention

The invention relates to a mirror drive device capable of high-speed forward and backward driving of a mirror.

Description of the Related Art

In a mirror mechanism incorporated in an image pickup apparatus, such as a digital single-lens reflex camera, a mirror enters a photographing optical path (mirror down) during finder observation to guide an object light flux to a finder, and during photographing, the mirror retracts from the photographing optical path (mirror up) to guide the object light flux to an image pickup device.

In recent years, however, the speed of forward and backward driving of the mirror has been increased by an increase in consecutive photographing speed. Further, a power amount required by the camera is increased such that the camera can perform higher-level processing at a higher speed, and it is required to reduce electric power required for the forward and backward driving of the mirror.

To this end, conventionally, there has been proposed a technique that holds a drive shaft of a mirror holder using a torsion spring, and drives the drive shaft by transmitting rotational movement of a mirror lever driven by a cam mechanism to the torsion spring via a portion that holds the torsion spring (Japanese Patent Laid-Open Publication No. H07-168280).

In Japanese Patent Laid-Open Publication No. H07-168280, when the spring pressure of the torsion spring is low, the power amount required for the forward and backward driving of the mirror is reduced. However, when the mirror lever is driven at a high speed, the mirror holder cannot follow the motion of the mirror lever, so that it is impossible to cause the mirror to advance or retract at a high speed.

On the other hand, if the spring pressure of the torsion spring is increased, the power amount required for the forward and backward driving of the mirror is increased, and force applied to the mirror holder when the mirror is held in a finder observation position is increased. This can bring about a problem that the mirror holder is deformed to distort a finder image and change a focus distance of an image viewed through the finder.

SUMMARY OF THE INVENTION

The invention provides a mirror drive device including a mechanism that realizes an increase in the speed of forward and backward movement of a mirror while reducing a power amount required for forward and backward driving of the mirror without affecting a finder image and a focus distance of an image viewed through a finder.

The invention provides a mirror drive device that drives a mirror between a first state in which the mirror enters a photographing optical path and a second state in which the mirror retracts from the photographing optical path, comprising a mirror holder having a driven portion and configured to hold the mirror, a first cam member configured to be cam-engageable with the driven portion, a second cam member configured to be cam-engageable with the driven portion, and a drive source configured to drive the first cam member and the second cam member, wherein in a case where the drive source has started to drive the first cam member and the second cam member from the first state, the driven portion and the first cam member are brought into cam engagement with each other, wherein before the mirror is placed in the second state, in a case where the drive source reduces a speed at which the first cam member and the second cam member are driven, the cam engagement between the driven portion and the first cam member is released, and the driven portion and the second cam member are brought into cam engagement with each other, wherein in a case where the mirror is placed in the second state, the driven portion and the first cam member are brought into cam engagement with each other again, wherein the drive source starts to drive the first cam member and the second cam member from the second state, the cam engagement between the driven portion and the first cam member is released, and the driven portion and the second cam member are brought into cam engagement with each other, wherein before the mirror is placed in the second state, in a case where the drive source reduces the speed at which the first cam member and the second cam member are driven, the cam engagement between the driven portion and the second cam member is released, and the driven portion and the first cam member are brought into cam engagement with each other, and wherein in a case where the mirror is placed in the first state, the driven portion is not brought into cam engagement with either of the first cam member and the second cam member.

According to the invention, it is possible to realize an increase in the speed of forward and backward movement of the mirror while reducing the power amount required for forward and backward driving of the mirror without affecting a finder image and a focus distance of an image viewed through a finder.

Further features of the invention will become apparent from the following description of exemplary embodiments (with reference to the attached drawings).

DESCRIPTION OF THE EMBODIMENTS

The invention will now be described in detail below with reference to the accompanying drawings showing embodiments thereof.

Figure 1:
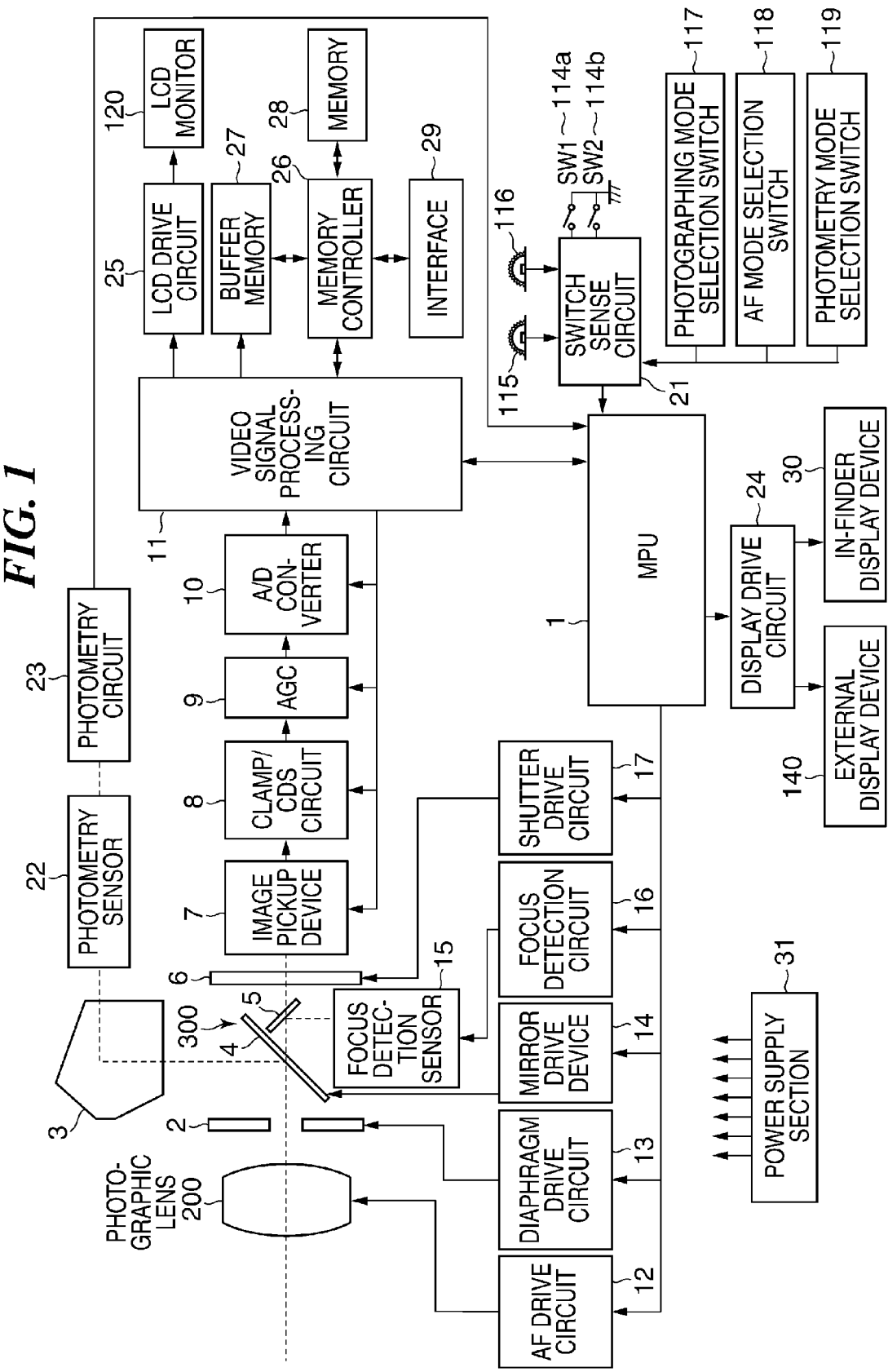
FIG. 1 is a block diagram of a digital single-lens reflex camera as an image pickup apparatus equipped with a mirror drive device according to a first embodiment of the invention.

FIG. 1 is a block diagram of a digital single-lens reflex camera as an image pickup apparatus equipped with a mirror drive device according to a first embodiment of the invention.

Referring to FIG. 1, in the digital single-lens reflex camera according to the first embodiment, an AF drive circuit 12, a diaphragm drive circuit 13, a mirror drive device 14, and a focus detection circuit 16 are connected to a MPU 1. Further, a shutter drive circuit 17, a video signal processing circuit 11, a switch sense circuit 21, a photometry circuit 23, and a display drive circuit 24 are connected to the MPU 1.

The AF drive circuit 12 is comprised of e.g. a stepper motor, and changes the position of a focus lens of a photographic lens 200 under the control of the MPU 1 to thereby cause an object image to be focused on an image pickup device 7. The diaphragm drive circuit 13 is comprised of e.g. an automatic iris, and changes a diaphragm 2 under the control of the MPU 1 to thereby change an optical aperture value.

A mirror mechanism 300 includes a main mirror 4, a sub mirror 5 pivotally supported with respect to the main mirror 4, and the mirror drive device 14 that drives the main mirror 4 together with the sub mirror 5. The main mirror 4 and the sub mirror 5 enter a photographing optical path (mirror down) during finder observation to guide an object light flux to a finder, and during photographing, they retract from the photographing optical path (mirror up) to guide the object light flux to the image pickup device 7. The mirror drive device 14 is comprised of e.g. a DC motor 307, referred to hereinafter, a gear train, and cam members, and drives the main mirror 4 together with the sub mirror 5 through the control of the DC motor 307 by the MPU 1.

The main mirror 4 is formed by a half mirror, and guides an object light flux having passed through the photographic lens 200 and the diaphragm 2 to a pentagonal roof prism 3 during finder observation. The sub mirror 5 reflects part of the object light flux having passed through the main mirror 4, and guides the same to a focus detection sensor 15.

The pentagonal roof prism 3 converts the object light flux guided thereto by the main mirror 4 to an erect normal object image. The object image obtained by the conversion is guided to a photometry sensor 22, and is observed through an eyepiece window, not shown.

The focus detection sensor 15 is disposed at a position substantially equivalent to the position of the image-forming plane of the image pickup device 7. The object light flux reflected by the sub mirror 5 forms an image on the detection surface of the focus detection sensor 15. The object image formed on the focus detection sensor 15 is photoelectrically converted to an electric image signal, and is supplied to the focus detection circuit 16.

The focus detection circuit 16 performs accumulation control and reading control of pixel information from the focus detection sensor 15 according to signals from the MPU 1, and outputs the pixel information to the MPU 1. The MPU 1 performs focus detection calculation by a phase difference detection method, based on the image signal of the object image from the focus detection circuit 16, and calculates a defocus amount and a defocus direction. Then, the MPU 1 changes the position of the focus lens of the photographic lens 200 via the AF drive circuit 12, and drives the focus lens to an in-focus position, based on the calculated defocus amount and defocus direction.

In the present embodiment, a focal plane shutter having a front blade group (not shown) and a rear blade group (not shown) is employed as a mechanical shutter 6. The front blade group blocks an object light flux during finder observation, and during photographing, retracts from the optical path of the object light flux in response to a release signal, to cause exposure to be started. The rear blade group retracts from the optical path of the object light flux during finder observation, and during photographing, blocks the object light flux at a predetermined time after the start of traveling of the front blade group. The mechanical shutter 6 is controlled by the shutter drive circuit 17 which has received a command from the MPU 1.

The image pickup device 7 is implemented e.g. by a CCD (charged coupled device) sensor or a CMOS (complementary metal oxide semiconductor) sensor. During photographing, an object light flux having passed through the photographic lens 200 and the diaphragm 2 forms an image on the image pickup device 7. The object image formed on the image pickup device 7 is photoelectrically converted to an electric image signal, and is delivered to a clamp/CDS (correlated double sampling) circuit 8 as an analog image signal.

The clamp/CDS circuit 8 performs basic analog processing and clamp level change processing on the signal delivered from the image pickup device 7, and delivers the processed signal to an AGC (automatic gain adjustment device) 9.

The AGC 9 performs basic analog processing and AGC basic level change processing on the signal delivered from the clamp/CDS circuit 8 and delivers the processed signal to an analog-to-digital converter 10. Note that the AGC basic level change processing is performed using a value associated with a setting of ISO. That is, when an ISO value is changed, the AGC basic level is changed.

The analog-to-digital converter 10 converts the analog image signal delivered from the AGC 9 to a digital image signal, and delivers the digital image signal to the video signal processing circuit 11.

The video signal processing circuit 11 performs image processing, such as gamma/knee processing, filtering processing, and information synthesis processing for monitor display, on digital image data. Further, the video signal processing circuit 11 outputs image data to an LCD (liquid crystal display) drive circuit 25 and a buffer memory 27, and further exchanges image data with a memory controller 26. Switching of these functions of the video signal processing circuit 11 is performed by data exchange between the video signal processing circuit 11 and the MPU 1. The video signal processing circuit 11 is capable of outputting white balance information of an output signal from the image pickup device 7, to the MPU 1, as required. In this case, the MPU 1 performs white balance adjustment and gain adjustment based on the white balance information output from the video signal processing circuit 11.

Image data for monitor display is output from the video signal processing circuit 11 to the LCD drive circuit 25, and an image represented by the image data is displayed on an LCD monitor 120. Further, the video signal processing circuit 11 is also capable of storing image data in the buffer memory 27 via the memory controller 26 according to an instruction from the MPU 1. Furthermore, the video signal processing circuit 11 has a function of performing compression processing, such as JPEG compression.

In the case of consecutive photographing, the video signal processing circuit 11 temporarily stores image data in the buffer memory 27, and in a case where it takes time to process image data, reads out unprocessed image data from the buffer memory 27 via the memory controller 26 to perform image processing and compression processing on the unprocessed image data. This realizes an increase in the speed of consecutive shooting.

The memory controller 26 stores unprocessed digital image data output from the video signal processing circuit 11, in the buffer memory 27. Further, the memory controller 26 stores processed digital image data in a memory 28 which is removable, and inversely outputs digital image data from the buffer memory 27 and the memory 28 to the video signal processing circuit 11. Furthermore, the memory controller 26 is capable of storing image data sent from an external apparatus via an interface 29 in the memory 28, and outputting image data stored in the memory 28 to the external apparatus via the interface 29.

The switch sense circuit 21 controls each section according to an operating state of an associated one of switches. A switch (SW1) 114a starts a photographing preparation operation by being turned on e.g. by half depression of a release button (not shown). A switch (SW2) 114b starts a photographing operation by being turned on e.g. by full depression of the release button. Further, a main electronic dial 115, a sub electronic dial 116, a photographing mode selection switch 117, an AF mode selection switch 118, and a photometry mode selection switch 119 are connected to the switch sense circuit 21, whereby operation information of each switch is transmitted to the MPU 1.

The photometry circuit 23 delivers an output from the photometry sensor 22 to the MPU 1 as a luminance signal of each of areas of an image pickup screen. The MPU 1 performs analog-to-digital conversion on the luminance signal to calculate exposure. The display drive circuit 24 drives an external display device 140 and an in-finder display device 30 according to instructions from the MPU 1. Further, the display drive circuit 24 is capable of setting a specific segment to a blinking display state according to an instruction from the MPU 1. A power supply section 31 supplies necessary power to the various ICs (integrated circuits) and drive device described above.

Figure 2:
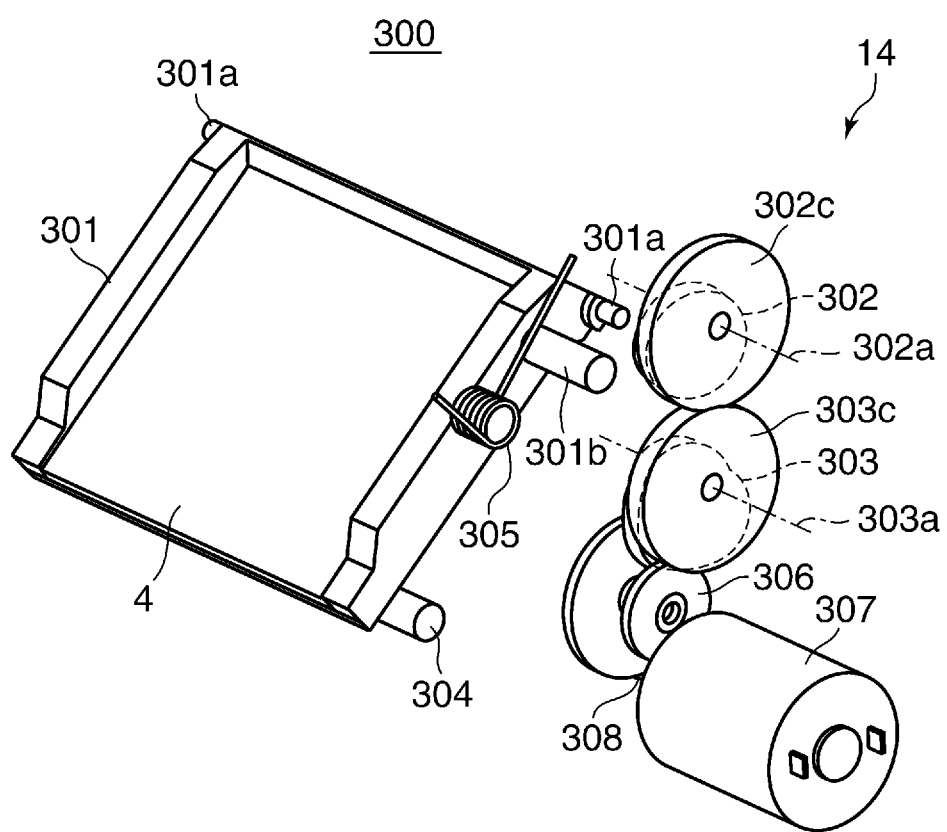
FIG. 2 is a perspective view of a main mirror and a mirror drive device which form a mirror mechanism.

FIG. 2 is a perspective view of the main mirror 4 and the mirror drive device 14 which form the mirror mechanism 300. Note that in FIG. 2, the sub mirror 5 is omitted from illustration, for convenience of explanation.

As shown in FIG. 2, the main mirror 4 is held by a mirror holder 301. The mirror holder 301 is provided with a hinge shaft 301a and a drive shaft 301b. The hinge shaft 301a is pivotally supported by a camera body (not shown). The drive shaft 301b corresponds to an example of a driven portion of the invention, and the camera body corresponds to an example of an apparatus body of the invention.

The mirror holder 301 is rotated about the hinge shaft 301a by a mirror-down cam 302 and a mirror-up cam 303, between a mirror-down position where the main mirror 4 and the sub mirror 5 enter the photographing optical path and a mirror-up position where the main mirror 4 and the sub mirror 5 retract from the photographing optical path. Further, the mirror-down cam 302 rotates about a rotation axis 302a, and the mirror-up cam 303 rotates about a rotation axis 303a disposed in parallel with the rotation axis 302a at a position different from the position of the rotation axis 302a.

In the following description, the rotational movement of the mirror holder 301 from the mirror-down position to the mirror-up position is referred to as the "mirror-up movement", and the rotational movement of the mirror holder 301 from the mirror-up position to the mirror-down position is referred to as the "mirror-down movement".

The mirror holder 301 is at rest in contact with a positioning pin 304 at the mirror-down position in a state urged toward the positioning pin 304 by a down spring 305 that is engaged with a base portion of the drive shaft 301b. Note that the positioning pin 304 is formed e.g. by an eccentric pin, and it is possible to adjust the mirror-down position by changing a contact position where the positioning pin 304 is in contact with the mirror holder 301 e.g. by rotating the positioning pin 304. The positioning pin 304 corresponds to an example of a positioning portion of the invention.

The mirror-down cam 302 is integrally formed with a gear portion 302c provided coaxially with the rotation axis 302a, and the mirror-up cam 303 is integrally formed with a gear portion 303c provided coaxially with the rotation axis 303a. The gear portion 302c and the gear portion 303c have the same number of gear teeth, and are in direct mesh with each other. Further, the gear portion 303c is in mesh with a shift gear train 306, and the shift gear train 306 is in mesh with a pinion 308 attached on an output shaft, not shown, of the DC motor 307.

Therefore, when the DC motor 307 is driven, the rotation of the DC motor 307 is transmitted to the pinion 308, the shift gear train 306, the gear portion 303c, and the gear portion 302c, whereby the mirror-down cam 302 and the mirror-up cam 303 are rotated.

Note that although in the present embodiment, the shift gear train 306 is caused to mesh with the gear portion 303c of the mirror-up cam 303, the shift gear train 306 may be caused to mesh with the gear portion 302c of the mirror-down cam 302. Further, although in the present embodiment, the DC motor 307 is used as a motor, another motor, such as a stepper motor, may be used. Furthermore, the number of gear teeth of the shift gear train 306 is not particularly limited.

Next, the mirror-up movement of the mirror mechanism 300 will be described with reference to FIGS. 3 and 4A to 4E.

Figure 3:
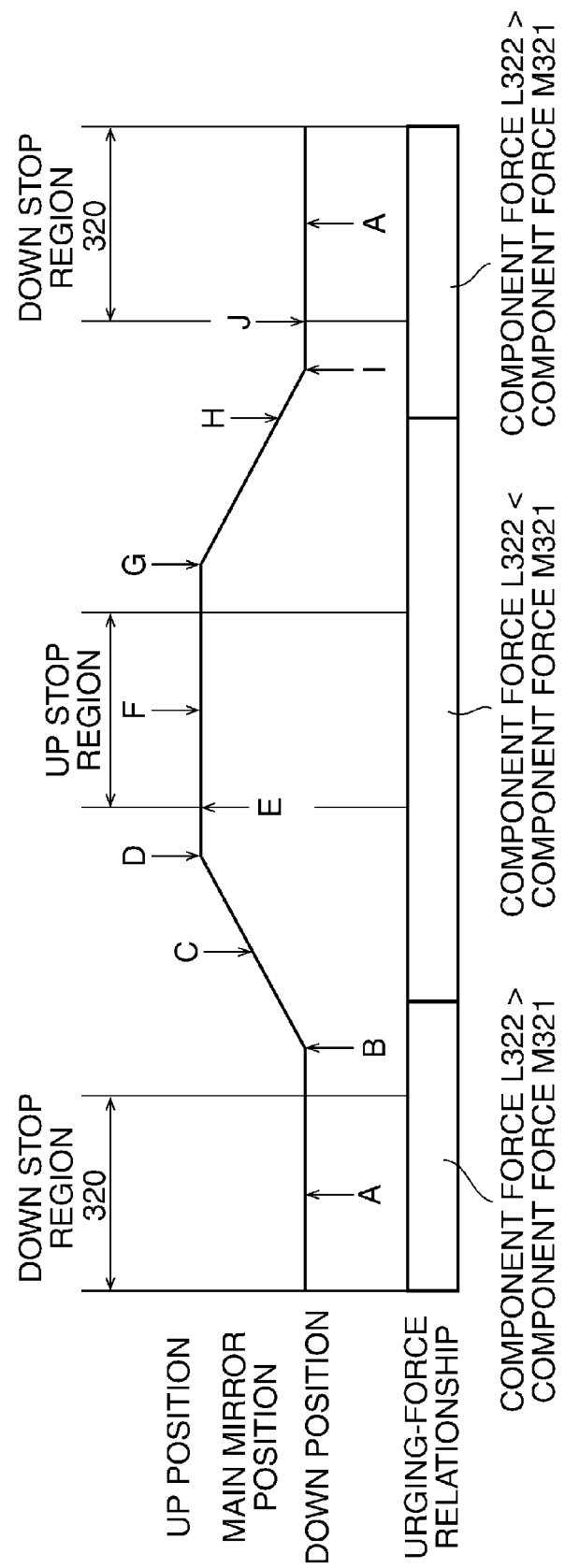
FIG. 3 is a graph showing a positional relationship of the main mirror with respect to a rotation angle of each of a mirror-down cam and a mirror-up cam.

FIG. 3 is a graph showing a positional relationship of the main mirror 4 with respect to the rotation angle of each of the mirror-down cam 302 and the mirror-up cam 303.

In FIG. 3, the horizontal axis represents the rotation angle of each of the mirror-down cam 302 and the mirror-up cam 303, and the vertical axis represents the rotational position of the main mirror 4. Further, a lower part of FIG. 3 shows a relationship between components of the urging force of the down spring 305 in association with a rotational position of the main mirror 4. The rotation angle of each of the mirror-down cam 302 and the mirror-up cam 303 is shown such that one rotation of each cam is performed between an arrow A shown at left in FIG. 3 and an arrow A shown at right in the same.

Further, referring to FIG. 3, a down stop region 320 is a region in which the mirror-down cam 302 and the mirror-up cam 303 are at rest when the main mirror 4 (mirror holder 301) is at rest in the mirror-down position. An up stop region is a region in which the mirror-down cam 302 and the mirror-up cam 303 are at rest when the main mirror 4 (mirror holder 301) is at rest in the mirror-up position.

FIGS. 4A to 4E are schematic side views showing the mirror-up movement of the mirror mechanism 300. Note that in FIGS. 4A to 4E, the gear portions 302c and 303c, the shift gear train 306, and the DC motor 307 are omitted from illustration, for ease of understanding the rotating operation of the mirror-down cam 302 and the mirror-up cam 303.

Figure 4A:
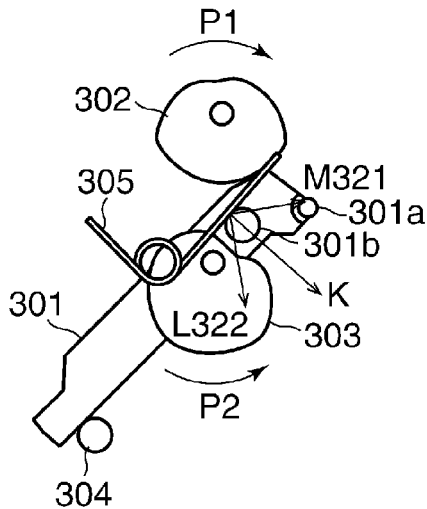
FIGS. 4A to 4E are schematic side views showing a mirror-up movement of the mirror mechanism.

FIG. 4A shows the mirror mechanism 300 in the mirror-down position. The state shown in FIG. 4A corresponds to a state of the mirror mechanism 300 indicated by the arrow A in FIG. 3. The mirror holder 301 is at rest in the mirror-down position, and the mirror-down cam 302 and the mirror-up cam 303 are at rest in the down stop region 320.

The mirror holder 301 is held in the mirror-down position in contact with the positioning pin 304, in a state urged toward the positioning pin 304 by the down spring 305. Further, a sufficient clearance is provided between the drive shaft 301b, and each of the mirror-down cam 302 and the mirror-up cam 303. This makes it possible to restrict the rotation angle of the main mirror 4 by the position of the positioning pin 304. Further, by adjusting the position of the positioning pin 304, it is possible to adjust the rotation angle of the main mirror 4.

Here, a force that the mirror holder 301 receives from the down spring 305 via the drive shaft 301b is referred to as the "urging force K", and a decomposed component of the urging force K, which acts in a direction in which the mirror holder 301 is rotated toward the positioning pin 304 is referred to as the "component force L322". Further, a decomposed component of the urging force K, which acts toward the center of rotation of the mirror holder 301 (the center of the hinge shaft 301a), is referred to as the "component force M321". In this case, in the mirror-down position, the relationship of the component force L322>the component force M321 holds. The component force M321 corresponds to an example of a first component force in the invention, and the component force L322 corresponds to an example of a second component force in the invention.

It is desirable that the magnitude of the component force L322 in the mirror-down position is set such that a force for bringing the mirror holder 301 into contact with the positioning pin 304 becomes minimum. By thus setting the magnitude of the component force L322, it is possible to reduce load acting on the mirror holder 301 from the down spring 305 during finder observation, and prevent deformation of the mirror holder 301 and the like inconveniences.

When the DC motor 307 is driven from the state shown in FIG. 4A, the mirror-down cam 302 and the mirror-up cam 303 are rotated in directions indicated by arrows P1 and P2, respectively. With this, the cam surface of the mirror-up cam 303 is cam-engaged with the drive shaft 301b of the mirror holder 301, whereby the mirror holder 301 is rotated toward the mirror-up position.

Figure 4B:
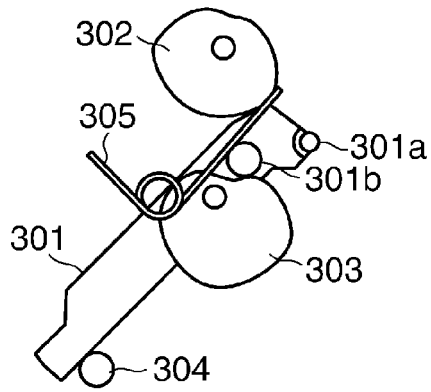

FIG. 4B shows a state of the mirror mechanism 300 in which the cam surface of the mirror-up cam 303 is cam-engaged with the drive shaft 301b. The state shown in FIG. 4B corresponds to a state indicated by an arrow B in FIG. 3.

As the mirror holder 301 is moved closer to the mirror-up position from the position shown in FIG. 4B, the component force L322 becomes smaller, and the component force M321 becomes larger. Then, the magnitude of the component force L322 and that of the component force M321 become equal to each other in the course of the mirror-up movement, and then before the mirror-up position is reached, the component force M321 becomes larger than the component force L322 (the component force M321>the component force L322). A position at which the magnitudes of the component force L322 and the component force M321 become equal to each other is provided at a location closer to the mirror-down position than to a location at which a region in which the mirror holder 301 is rotated is divided into two.

As described above, in the present embodiment, in a wide range of the region in which the mirror holder 301 is rotated, the component force L322 acting in the direction in which the mirror holder 301 is rotated toward the positioning pin 304 is made smaller than the component force M321 acting toward the center of rotation of the hinge shaft 301a (the component force M321>the component force L322).

This makes it possible to reduce a force resisting the mirror-up movement of the mirror holder 301, whereby it is possible to suppress an increase in power consumption of the DC motor due to the urging force K generated by the down spring 305.

Figure 4C:
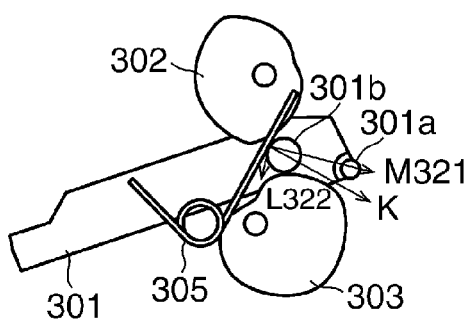

FIG. 4C shows a state of the mirror mechanism 300 at a time at which the deceleration of the DC motor 307 is started by reducing an effective voltage for driving the DC motor 307 e.g. by PWM (pulse width modulation). The state shown in FIG. 4C corresponds to a state indicated by an arrow C in FIG. 3.

It is desirable that in the state shown in FIG. 4C, the component force M321 is larger than the component force L322 (the component force M321>the component force L322). The component force L322 acts as driving load in the mirror-up movement of the mirror holder 301, and deceleration driving by PWM of the DC motor 307 reduces output torque. For this reason, for deceleration driving of the DC motor 307, a start time is preferable to be set according to the driving load. By starting deceleration of the DC motor 307 in a section where the component force L322 is smaller than the component force M321, it is possible to make smaller the effective voltage for driving the DC motor 307 and obtain larger deceleration effects.

When deceleration of the DC motor 307 is started, the rotational speeds of the mirror-down cam 302 and the mirror-up cam 303 are reduced following the deceleration of the DC motor 307, but the speed of the rotation of the mirror holder 301 is reduced with a delay due to an inertial force. Therefore, although the drive shaft 301b of the mirror holder 301 is driven following the mirror-up cam 303 before the start of deceleration of the DC motor 307, the drive shaft 301b is separated from the mirror-up cam 303 after the start of deceleration of the DC motor 307.

Figure 4D:
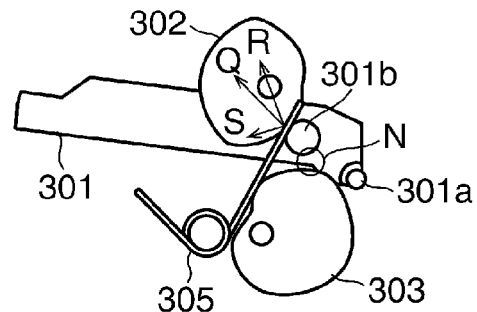

FIG. 4D shows a state of the mirror mechanism 300 in which the drive shaft 301b is moved away from the mirror-up cam 303 and is cam-engaged with the cam surface of the mirror-down cam 302. The state shown in FIG. 4D corresponds to a state indicated by an arrow D in FIG. 3.

Referring to FIG. 4D, the drive shaft 301b, which has been separated from the mirror-up cam 303 by the deceleration of the DC motor 307, is brought into contact with the mirror-down cam 302. At this time, although the cam surface of the mirror-down cam 302 as well is going to be separated from the drive shaft 301b while being rotated, the drive shaft 301b is driven while being reduced in rotational speed in accordance with the rotation of the mirror-down cam 302 until the cam surface of the mirror-down cam 302 is separated from the drive shaft 301b. In FIG. 4D, N indicates a gap formed by separation between the mirror-up cam 303 and the drive shaft 301b.

When the drive shaft 301b is brought into contact with the mirror-down cam 302, much of force Q received by the mirror-down cam 302 from the drive shaft 301b is forms a component force R acting toward the rotation axis 302a of the mirror-down cam 302. Therefore, a component force S that acts in a direction in which the inertial force of the mirror holder 301 rotates the mirror-down cam 302 is made smaller, and influence of the inertial force of the mirror holder 301 on the deceleration of the DC motor 307 is made smaller, which increases the controllability of the mirror holder 301.

The reduction of the rotational speeds of the mirror-down cam 302 and the mirror-up cam 303 has an effect of holding the rotation stop angle of the mirror-up cam 303 within the up stop region appearing in FIG. 3. Further, the reduction of the rotational speed of the mirror holder 301 has an effect of reducing an impact generated at the time of stoppage of the mirror holder 301, thereby reducing the vibration of the camera body. The vibration of the camera body causes discomfort transmitted to a photographer's hand and blurring of a photographed image, and hence it is desirable to minimize the vibration.

When the mirror holder 301 has passed through the rotation angle shown in FIG. 4D to enter the up stop region, the DC motor 307 is stopped by a short brake. This short brake control is started at the entrance to the up stop region indicated by an arrow E in FIG. 3. The entrance to the up stop region corresponds to an angle which can positively guarantee that the mirror holder 301 has reached the mirror up position.

Figure 4E:
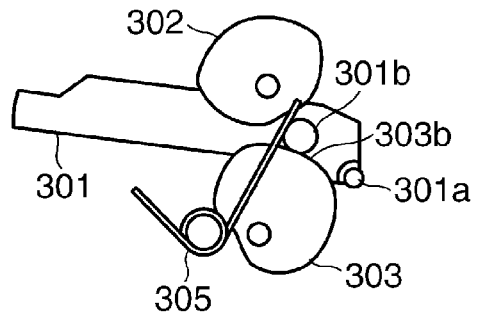

FIG. 4E shows a state of the mirror mechanism 300 in which the mirror-down cam 302 and the mirror-up cam 303 are at rest in the up stop region after the DC motor 307 has been stopped by the short brake. The state shown in FIG. 4E corresponds to a state indicated by an arrow F in FIG. 3. In this state, the drive shaft 301$b$ is brought into the mirror-up cam 303 again at a cam top surface 303$b$ thereof. In this state, the position of the mirror holder 301 is determined by the cam top surface 303$b$ of the mirror-up cam 303 which is in contact with the drive shaft 301$b$.

Next, the mirror-down movement of the mirror mechanism 300 will be described with reference to FIGS. 3 and 5A to 5E. FIGS. 5A to 5E are schematic side views showing the mirror-down movement of the mirror mechanism 300. Note that in FIGS. 5A to 5E, the gear portions 302$c$ and 303$c$, the shift gear train 306, and the DC motor 307 are omitted from illustration, for ease of understanding the rotating operation of each of the mirror-down cam 302 and the mirror-up cam 303.

Figure 5A:
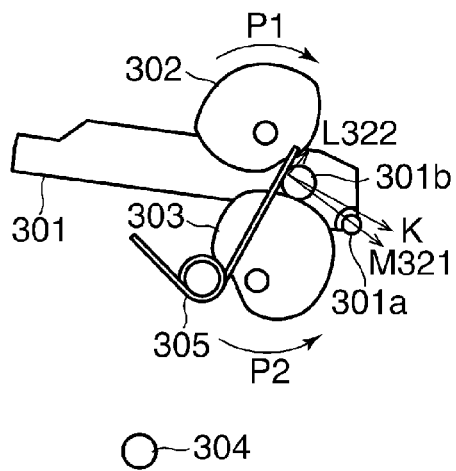
FIGS. 5A to 5E are schematic side views showing a mirror-down movement of the mirror mechanism.

FIG. 5A shows the mirror mechanism 300 in the mirror-up position. The state shown in FIG. 5A corresponds to the state indicated by the arrow F in FIG. 3. Similar to FIG. 4E, the mirror holder 301 receives the urging force K from the down spring 305, and receives the component force L322 which rotates the mirror holder 301 toward the mirror-down position, and the component force M321 which does not rotate the mirror holder 301 toward the mirror-down position.

The DC motor 307 is driven from the state shown in FIG. 5A to rotate the mirror-down cam 302 and the mirror-up cam 303 in respective directions P1 and P2, whereby the cam surface of the mirror-down cam 302 is cam-engaged with the drive shaft 301$b$ to rotate the mirror holder 301.

Figure 5B:
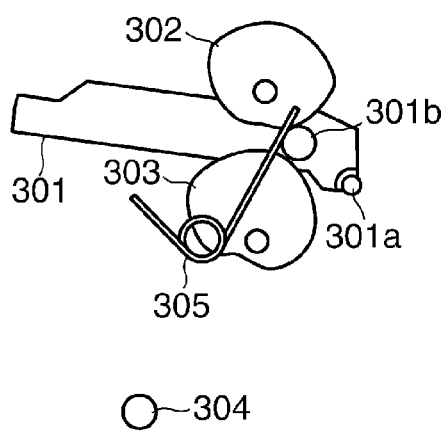

FIG. 5B shown a state of the mirror-down cam 302 being cam-engaged with the drive shaft 301$b$. The state shown in FIG. 5B correspond to a state indicated by an arrow G in FIG. 3.

The down spring 305 is set to have a low spring pressure which is necessary and sufficient for the component force L322 to hold the mirror holder 301 in the mirror-down position. For this reason, during the mirror-down movement, it is impossible to cause the drive shaft 301$b$ to follow the cam surface of the mirror-up cam 303 by the urging force K of the down spring 305. Therefore, is the drive shaft 301$b$ is driven following the cam surface of the mirror-down cam 302.

As described above, by driving the drive shaft 301$b$ using the mirror-down cam 302 other than the mirror-up cam 303, it is possible to rotate the mirror holder 301 toward the mirror-down position at an intended speed.

Figure 5C:
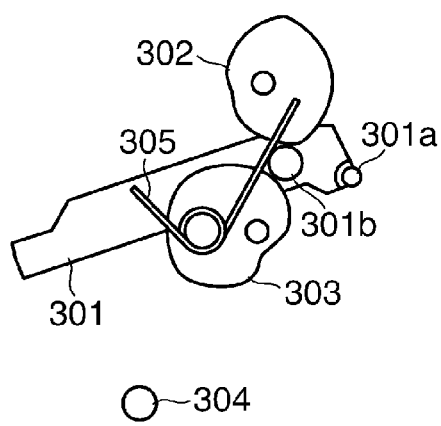

FIG. 5C shows a state of the mirror mechanism 300 at a start time of the deceleration of the DC motor 307. The state shown in FIG. 5C corresponds to a state indicated by an arrow H in FIG. 3.

In the mirror-down movement, the component force L322, which is a rotational force component of the urging force K of the down spring 305, is smaller than the component force M321 but serves as a force assisting the mirror-down movement, and hence the start time of the deceleration of the DC motor 307 may be set as desired.

When deceleration of the DC motor 307 is started, inversely to the above-described mirror-up movement, the drive shaft 301$b$ is separated from the mirror-down cam 302 and is cam-engaged with the cam surface of the mirror-up cam 303, whereby the rotational speed of the mirror holder 301 is reduced.

Figure 5D:
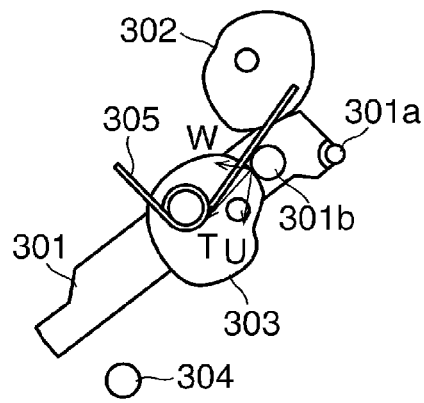

FIG. 5D shows a state of the mirror mechanism 300 in which the drive shaft 301$b$ is cam-engaged with the cam surface of the mirror-up cam 303, and the mirror holder 301 is rotated while being reduced in the rotational speed thereof. The state shown in FIG. 5D corresponds to a state indicated by an arrow I in FIG. 3.

In the state shown in FIG. 5D, much of force T received by the mirror-up cam 303 from the drive shaft 301$b$ forms a component force U acting toward the rotation axis 303$a$ of the mirror-up cam 303, and a component force W that acts in a direction in which the inertial force of the mirror holder 301 rotates the mirror-up cam 303 is made smaller. Therefore, influence of the inertial force of the mirror holder 301 on the deceleration of the DC motor 307 is made smaller, whereby the controllability for reducing the rotational speed of the mirror holder 301 is increased.

Similar to during the mirror-up movement, the above-described reduction of the rotational speeds of the mirror-down cam 302 and the mirror-up cam 303 has effects of holding the rotation stop angle of the mirror-up cam 303 within the down stop region 320 and reducing the vibration of the camera body.

When the mirror holder 301 has passed through the rotation angle shown in FIG. 5D and enters the down stop region 320, the DC motor 307 is stopped by a short brake. This short brake control is started at the entrance to the down stop region 320 indicated by an arrow J in FIG. 3. The entrance to the down stop region 320 corresponds to an angle which can positively guarantee that the mirror holder 301 has reached the mirror down position.

Figure 5E:
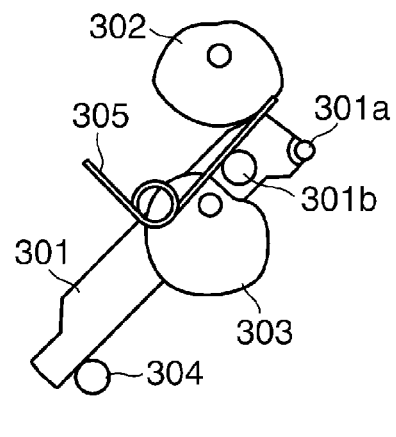

FIG. 5E shows a state of the mirror mechanism 300 in which the mirror-down cam 302 and the mirror-up cam 303 are at rest in the down stop region 320 after the DC motor 307 has been stopped by the short brake. The state shown in FIG. 5E corresponds to the state indicated by the arrow A in FIG. 3.

As described heretofore, in the present embodiment, the mirror holder 301 is directly driven by the mirror-down cam 302 and the mirror-up cam 303 of which the rotation axis positions are different from each other. Therefore, the urging force of the down spring 305 for holding the mirror holder 301 in the mirror-down position can be secured by a low spring pressure which is necessary and sufficient therefor. This makes it possible to reduce load acting on the mirror holder 301 from the down spring 305 during finder observation. As a consequence, it is possible to prevent deformation of the mirror holder 301 and the like inconveniences, which affects a finder image and a focus distance of an image viewed through the finder, and reduce a power amount required for forward and backward driving of the main mirror 4.

Further, in the present embodiment, by directly driving the mirror holder 301 using the mirror-down cam 302 and the mirror-up cam 303, it is possible to reduce the number of component parts interposed between the mirror holder 301 and the DC motor 307. This makes it possible to reduce the amount of play between interposed components, and portions which cause inertial force and frictional resistance, whereby it is possible to enhance energy efficiency to realize an increase in the speed of forward and backward driving of the main mirror 4.

Next, a digital single-lens reflex camera as an image pickup apparatus equipped with a mirror drive device according to a second embodiment of the invention will be described with reference to FIGS. 3, 6A, 6B, and 7A to 7E. Note that description of duplicate or corresponding portions of the first embodiment is omitted or simplified while denoting the portions by the same reference numerals as used in the first embodiment.

Figure 6A:
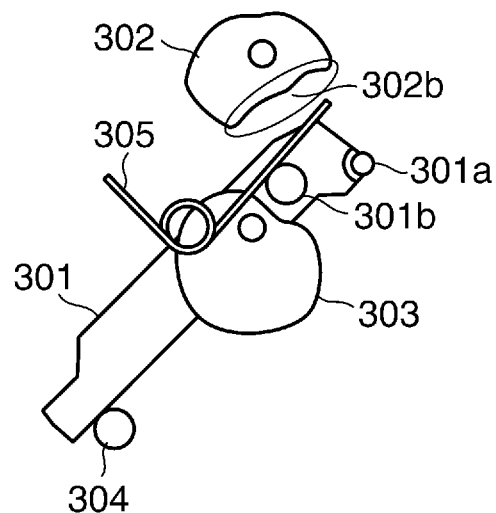
FIGS. 6A and 6B are schematic side views showing a rotational movement of a mirror holder performed when the mirror holder in the mirror-down position is manually rotated to the mirror-up position without driving a DC motor, in a digital single-lens reflex camera as an image pickup apparatus equipped with a mirror drive device according to a second embodiment of the invention.
Figure 6B:
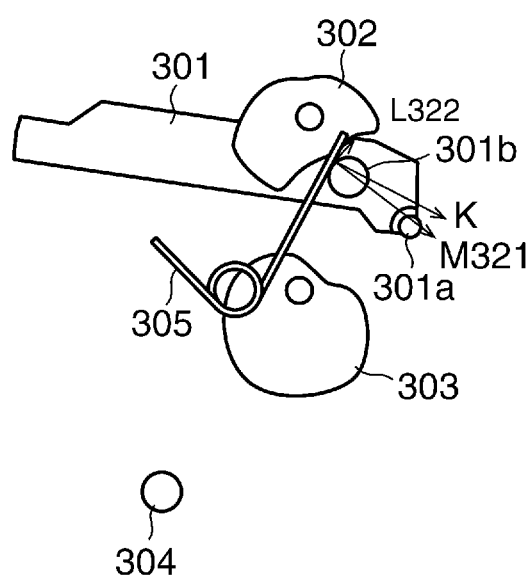

FIGS. 6A and 6B are schematic side views showing operations of the mirror holder 301 performed when the mirror holder 301 in the mirror-down position is manually rotated to the mirror-up position without driving the DC motor 307. Note that in FIGS. 6A and 6B, the gear portions 302c and 303c, the shift gear train 306, and the DC motor 307 are omitted from illustration, for ease of understanding the rotating operation of each of the mirror-down cam 302 and the mirror-up cam 303.

FIG. 6A shows a state of the mirror mechanism 300 during finder observation and corresponds to the state indicated by the arrow A in FIG. 3. Referring to FIG. 6A, the mirror holder 301 is urged toward the positioning pin 304 by the down spring 305 and is held in the mirror-down position (finder observation position) with the mirror holder 301 being in contact with the positioning pin 304. Further, the mirror-down cam 302 is provided with a recess 302b, so as to prevent the mirror-down cam 302 from interfering with the drive shaft 301b, when manually rotating the mirror holder 301 alone to the mirror-up position without energizing the DC motor 307, in whichever portion of the down stop region 320 the mirror holder 301 may be at rest.

FIG. 6B shows a state of the mirror mechanism 300 in which the mirror holder 301 alone has been rotated to the mirror-up position. In the state shown in FIG. 6B, the drive shaft 301b of the mirror holder 301 has entered the recess 302b of the mirror-down cam 302.

By forming the recess 302b as described above, it is possible to manually rotate the mirror holder 301 to a desired position. This makes it possible to enhance operability mainly when cleaning of a shutter blade (not shown) or the sub mirror 5 is performed as a maintenance operation.

Figure 7A:
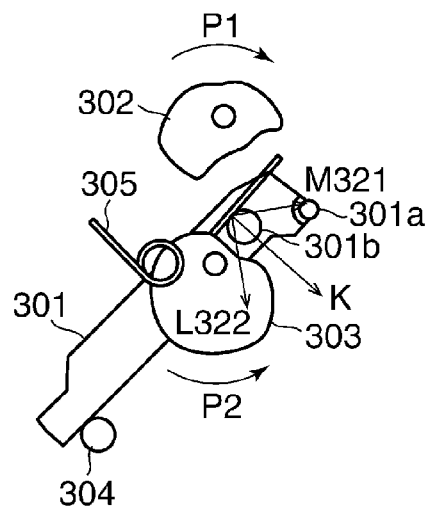
FIGS. 7A to 7E are schematic side views showing a mirror-up movement of the mirror mechanism.

FIGS. 7A to 7E are schematic side views showing the mirror-up movement of the mirror mechanism 300. FIG. 7A shows a state of the mirror mechanism 300 in which the mirror holder 301 is held in the mirror-down position.

When the DC motor 307 is driven in the state shown in FIG. 7A, the mirror-down cam 302 and the mirror-up cam 303 are rotated in the respective directions indicated by the arrows P1 and P2, whereby the cam surface of the mirror-up cam 303 is cam-engaged with the drive shaft 301b of the mirror holder 301 to cause rotation of the mirror holder 301.

Figure 7B:
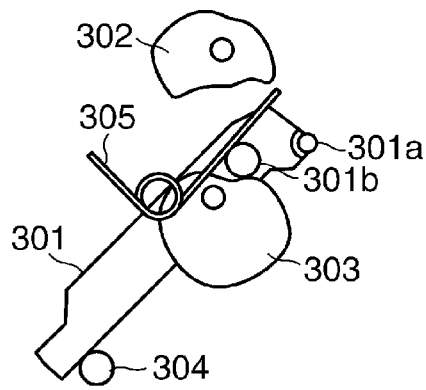

FIG. 7B shows a state of the mirror mechanism 300 in which the cam surface of the mirror-up cam 303 is cam-engaged with the drive shaft 301b. The state shown in FIG. 7B corresponds to the state indicated by the arrow B in FIG. 3.

Figure 7C:
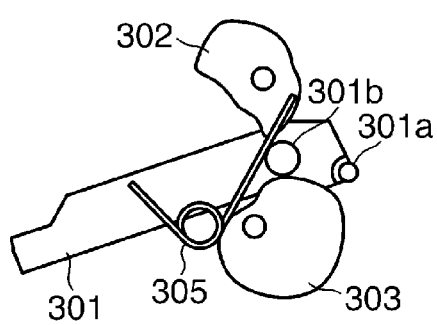

FIG. 7C shows a state of the mirror mechanism 300 at a time at which the deceleration of the DC motor 307 is started by reducing an effective voltage for driving the DC motor 307 e.g. by PWM. The state shown in FIG. 7C corresponds to the state indicated by the arrow C in FIG. 3.

As described hereinabove, when the DC motor 307 is decelerated, the drive shaft 301b is separated from the mirror-up cam 303 toward the mirror-down cam 302. At this time, assuming that the recess 302b is arranged on a path along which the drive shaft 301b moves toward the mirror-down cam 302, the drive shaft 301b enters the recess 302b, and is pushed back toward the mirror-down position by a side of the recess 302b. In this case, the cam surface of the mirror-up cam 303 is cam-engaged with the drive shaft 301b, whereby the mirror-up movement is started again.

To avoid such an unnatural movement of the mirror holder 301, it is necessary to start deceleration of the DC motor 307 at a time after the recess 302b has disappeared from the path along which the drive shaft 301b moves toward the mirror-down cam 302. Similar to the above-described first embodiment, it is desirable that the start time of the deceleration of the DC motor 307 is after the component force L322 has been made smaller than the component force M321.

To this end, in the present embodiment, the deceleration driving of the DC motor 307 is started after the component force L322 has been made smaller than the component force M321, and the recess 302b of the mirror-down cam 302 has disappeared from the path along which the drive shaft 301b moves toward the mirror-down cam 302.

Figure 7D:
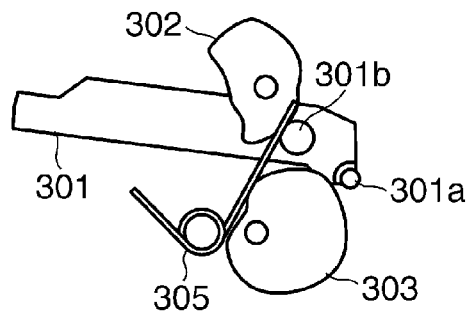
Figure 7E:
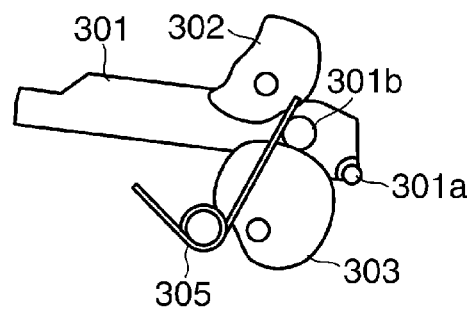

FIG. 7D shows a state of the mirror mechanism 300 in which the mirror holder 301 has reached the mirror up position. The state shown in FIG. 7D corresponds to the state indicated by the arrow D in FIG. 3. Further, FIG. 7E shows a state of the mirror mechanism 300 in which the mirror-down cam 302 and the mirror-up cam 303 are at rest in the up stop region. The state shown in FIG. 7E corresponds to the state indicated by the arrow F in FIG. 3. The other configuration and advantageous effects are the same as described as to the first embodiment.

Note that the invention is not limited to the above-described embodiments, but the material, shape, dimension, form, number, and location of each of the components can be modified on an as-needed basis, without departing from the spirit and scope thereof.

While the invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-130418 filed Jun. 25, 2014 which is hereby incorporated by reference herein in its entirety.

What is claimed is:

1. A mirror drive device that drives a mirror between a first state in which the mirror enters a photographing optical path and a second state in which the mirror retracts from the photographing optical path, the mirror drive device comprising:

a mirror holder having a shaft and configured to hold the mirror;

a first cam member configured to be cam-engageable with the shaft;

a second cam member configured to be cam-engageable with the shaft; and a drive source configured to drive the first cam member and the second cam member, wherein the mirror drive device is configured such that when the mirror is placed in the second state, the shaft and the first cam member are brought into cam engagement with each other, and wherein the mirror drive device is configured such that when the mirror is placed in the first state, the shaft is not brought into cam engagement with either of the first cam member and the second cam member.

2. The mirror drive device according to claim 1, further comprising an urging member configured to urge the mirror holder so as to place the mirror in the first state, wherein an urging force of the urging member for urging the mirror holder is decomposed into a first component force acting toward a rotational center of the mirror holder and a second component force acting in a direction in which the mirror holder is caused to be rotated so as to place the mirror in the first state, wherein the mirror drive device is configured such that a magnitude relationship between the first component force and the second component force is changed in response to a position of the mirror.

3. The mirror drive device according to claim 2, wherein the mirror drive device is configured such that when the second component force becomes smaller than the first component force, the drive source reduces the speed at which the first cam member and the second cam member are driven.

4. The mirror drive device according to claim 1, further comprising an positioning member configured to be brought into contact with the mirror holder when the mirror is placed in the first state, wherein the positioning member is provided such that a position of contact thereof with the mirror holder can be adjusted.

5. The mirror drive device according to claim 1, wherein the mirror drive device is configured such that when the mirror is changed from the first state into the second state without driving by the drive source, the shaft and the second cam member are not brought into cam engagement with each other.

* * * * *